United States Patent
Kawabe et al.

[11] Patent Number: 5,968,127
[45] Date of Patent: Oct. 19, 1999

[54] INFORMATION PROCESSING APPARATUS

[75] Inventors: Shigehisa Kawabe; Kazunori Horikiri, both of Nakai-machi, Japan

[73] Assignee: Fuji Xerox Co., Ltd., Tokyo, Japan

[21] Appl. No.: 08/906,960

[22] Filed: Aug. 6, 1997

[30]      Foreign Application Priority Data

Aug. 8, 1996   [JP]   Japan  .................................... 8-210049

[51] Int. Cl.[6] .................................................. G06F 13/00
[52] U.S. Cl. .......................................................... 709/226
[58] Field of Search ................................... 709/226, 300, 709/302, 101, 102, 103, 104, 108; 710/5, 12

[56]               References Cited

U.S. PATENT DOCUMENTS

| | | | |
|---|---|---|---|
| 5,347,632 | 9/1994 | Filepp et al. ........................... | 395/200 |
| 5,659,750 | 8/1997 | Priem et al. . | |
| 5,706,501 | 1/1998 | Horikiri et al. . | |
| 5,764,861 | 6/1998 | Priem et al. . | |
| 5,878,258 | 3/1999 | Pizi et al. . | |
| 5,909,595 | 1/1999 | Rosenthal et al. . | |

FOREIGN PATENT DOCUMENTS 7-182174   7/1995   Japan .

OTHER PUBLICATIONS

Charles Brooks et al., Application–Specific Proxy Servers as HTTP Stream Transducers, Proceedings of the Fourth International World Wide Web Conference, OSF Research Institute, Dec. 11–14, 1995, pp. 1–8.

Jerry R. Jackson, et al., JAVA by example, 2$^{nd}$ Edition, Chapter 18, pp. 304–348.

James Gosling et al., Java, SUN, Sun Microsystems Computer Company, May 1995, pp. 38–40; 56–61.

*Primary Examiner*—Moustafa M. Meky
*Attorney, Agent, or Firm*—Oliff & Berridge, PLC

[57]             ABSTRACT

An information processing apparatus which makes it possible for a user or a third party to easily or unconsciously apply arbitrary procedures and expand application functions in accessing resources. When a name is input, that name is analyzed by the name parser. The context input unit loads the context determined from the analysis results from the context holding unit. The name is converted into a set composed of a resource name and a procedure in accordance with the loaded context. The context may also be used recursively. The resource initiation unit connects the output of the procedure and the data input port of the data input/output unit, or the input of the procedure and the data output port of the data input/output unit, and causes the procedure to be executed when the data input/output unit accesses the resource.

6 Claims, 5 Drawing Sheets

| MERGE2 | P1 (<FS, X1>, <FS, X2>) |
| MERGE3 | PP (<FS, X1>, <FS, X2>, <FS, X3>) |
| MERGE4 | PPP (<FS, X1>, <FS, X2>, <FS, X3>, <FS, X4>) |
| MERGE5 | P1 (<C2, X1>, <C2, X2>) |

FIG.4A

```
<TITLE>C1</TITLE>
<BODY>
<H2> NAME CONVERSION TABLE </H2>
<table border=0>
<tr><td>MERGE2</td>
<td>P1(<FS, X1>, <FS, X2>) </td></tr>
<tr><td>MERGE3</td>
<td>PP(<FS, X1>, <FS, X2>), <FS, X3> </td></tr>
<tr><td>MERGE4</td>
<td>PPP(<FS, X1>, <FS, X2>), <FS, X3>, <FS, X4>) </td>
</tr>
<tr><td>MERGE5</td>
<td>P1(<C2, X1>, <C2, X2>) </td></tr>
</table>
</BODY>
</HTML>
```

INFORMATION PROCESSING APPARATUS

BACKGROUND OF THE INVENTION

1. Field of Application

The present invention relates to an information processing apparatus that expands the function of an application by automatically executing procedures for the accessing of resources in a networked computer system or a single computer system.

2. Description of Related Art

In a computer system where a plurality of computer systems executing information processes are distributed and arranged in a network, each computer system contains local or global resources. These resources may be, for example, a file system, a database, a printer, or a networked computer. Additionally, data and programs which are provided by various services are also known as resources. For example, files and remote programs are resources. Furthermore, in broadcasting, audio and video information are also resources, and such information is continuous stream data, which is different from the conventional file data.

Generally, when a resource name is given to a computer system, a handle for accessing the resource corresponding to that name is obtained. An operation for the resource is applicable to the handle. For example, in a file system, a file descriptor is the handle, and the operation is "read" or "write". In a computer system, everything that enables acquisition of the handle is a resource.

An application is a program which retrieves and processes information from the resource, or is a program which sends the processed data to the resource. An example of an application is a data display device (browser) for the World Wide Web (WWW). When a user inputs the data name into the browser, the browser accesses the resource that is determined by the name, retrieves the data and displays the data in a specified window in the display screen. It is desirable to be able to expand the functions of such an application using specific methods in order to enable displaying of information of the retrieved data with a new format provided by a third party or to enable the application user to customize the data being retrieved through preprocessing or postprocessing.

One of the conventional methods for expanding functions of such applications is called the plug-in method. The plug-in method is an executable module which provides a procedure being called from the application using a specific application program interface (API). In general, a plug-in is loaded and dynamically linked in the application process space after startup of the application. Thus, the plug-in module is able to access resources (memory and files) that the application manages in the same process space. In the case of an application that runs with a window system, for example, a part of the graphic image originally drawn in the window by the application may be edited and redrawn by a procedure which is contained in the plug-in module.

Netscape Navigator (hereafter Netscape), an information browser from Netscape Communications Corp., accesses the WWW system, retrieves information in a specific format such as HTML (hyper text mark-up language) using a specific protocol such as HTTP (hyper text transfer protocol), renders the retrieved information to raster information, and displays the raster image in the specific window on the screen.

Using a plug-in, information in a specific format which Netscape alone cannot interpret but which the plug-in can interpret may be retrieved using a specific protocol, processed by the plug-in, rendered as a raster image containing text, and displayed in a Netscape window. This information may also be played back as audio or video.

In the case of Netscape, the plug-in module is created as a dynamic linking library (DLL), is loaded dynamically in the Netscape process space, and shares the process space with Netscape.

In the application function expansion method using such a plug-in, it becomes necessary to provide a plug-in corresponding to each type and format of information to be accessed, and to implement the plug-in dynamically loadable in the application process space.

Another type of application function expansion method is a remote programming system in the distributed network system. For example, the execution method of the remote programming disclosed in Japanese Laid-Open Patent Publication 7-182174 is a remote programming method in which a program is provided for executing data processing based on a specific instruction set, where an agent process, which is a part of the program, is transferred by a "go" (begin execution) operation to a remote computer system through a network, and the agent process is run on the remote computer system to accomplish data processing. In this method function expansion is realized by running a process to expand the application functions in the remote computer.

The applet based on Java technology, disclosed and provided by Sun Microsystems Inc., is a network loadable program in a remote programming system similar to the remote programming system disclosed in Japanese Laid-Open Patent Publication 7-182174, wherein a program for accomplishing data processing based on a specific instruction set is stored in a server on a network. Upon accessing the applet with a specific protocol, the applet is loaded into a resource display device or browser via the network, and runs to accomplish data processing ("The Java Language Environment", July, 1995 Sun Microsystems Inc.).

In either of the two methods described above, the program for accomplishing data processing may be loaded in the computer which runs the resource display device, or may be transferred to the remote computer to accomplish preprocessing or postprocessing of the data which accesses the resource.

The interactive computer network reception system and its method of operation, disclosed in U.S. Pat. No. 5,347,632, receives input from the user via a personal computer and converts them into data that is dependent on a computer and into executable code objects in the interactive computer system network. These data and codes are distributed and stored in a personal computer and a remote host computer. By combining the application to process the input from the user, the data and codes make it possible to display information desired by the user and to accomplish the desired transaction service, namely, data processing including preprocessing and postprocessing.

However, loading a program which can operate with multipurpose functions from a network or a memory device to a computer system and giving authority to execute for the purpose of preprocessing or postprocessing the data used to access the resource present security problems. Detection and prevention of unauthorized use of and damage to the resources in the computer system on which the program is loaded are difficult. The above execution methods also makes contamination by so-called computer virus easy.

Moreover, it is difficult to dynamically change the operation of the expanded function because the rules, methods and results of conversion are determined beforehand by the side which provides the service and applications in order to convert input from the user into directly executable code objects.

For example, in the case of a plug-in, it is necessary to store the plug-in module which handles a specific format and executes a specific process in a location where the application can be dynamically linked. As a result, changing of the plug-in process for each data accessed or according to the intent of the user is difficult.

Furthermore, in the remote programming system, it is possible for the manager of a server which stores a remote program providing an expansion function to change a function of the remote program: changes resulting in concurrent changing of the expansion functions of all the applications that use the remote program. As a result, this system is not usable when customized expansion functions are desired for each user.

In the above-described conventional expansion method for application functions, it is difficult for a third party other than the service or application provider and a user who uses the application to change the expansion function, including preprocessing and postprocessing for each item of information accessed or for each user of the application.

SUMMARY OF THE INVENTION

It is an objective of the present invention to provide an information processing apparatus which makes it possible for a user or a third party to easily or unconsciously expand application functions which apply arbitrary procedures including preprocessing and postprocessing in accessing resources.

The invention is an information processing apparatus which manipulates resources in a computer system, having a resource manager; a context holding capability for holding one or more contexts, or objects, corresponding to rules for analyzing and converting a name being input to a set consisting of a resource name that specifies one or more resources being previously realized and a procedure for processing data being input or output from the resource; interpreting the name being input based on the context as needed, for converting the name into the set consisting of the resource name and the procedure, for inputting the resource that is determined from the conversion result, and for interpreting and outputting processing results by executing the procedure.

DESCRIPTION OF PREFERRED EMBODIMENTS

Figure 1:
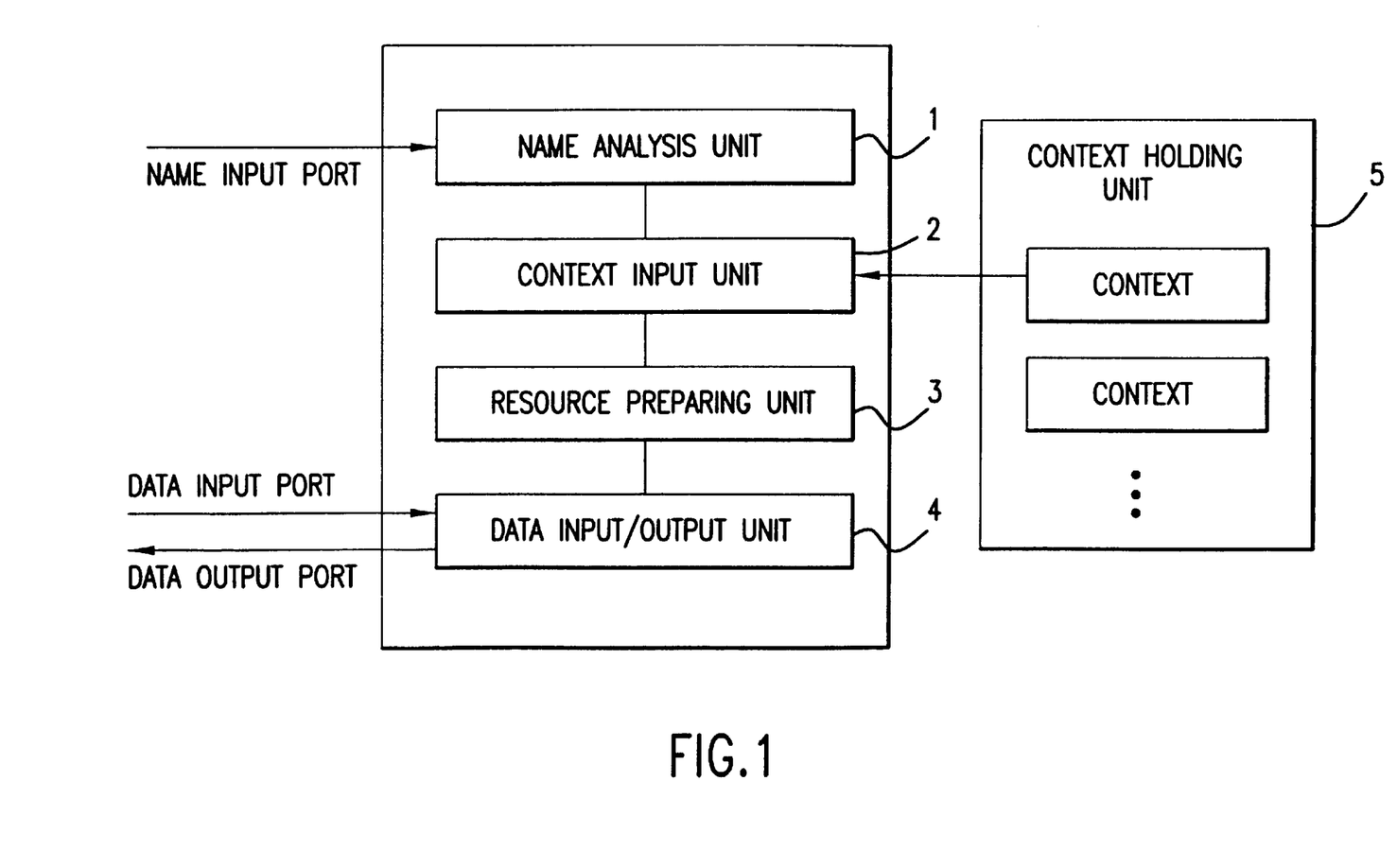
FIG. 1 is a block diagram depicting one configuration of the first embodiment of the information processing apparatus of the present invention.

FIG. 1 is a block diagram showing the first embodiment of the information processing apparatus of the present invention. In the figure, reference number 1 designates a name analysis unit, reference number 2 designates a context input unit, reference number 3 designates a resource initiation unit, reference number 4 designates a data input/output unit, and reference number 5 designates a context holding unit. The information processing apparatus of the present invention analyzes the name being input, reads the context which is determined by the results of analysis, and analyzes and converts the name into a tuple that is called resource representation, by using the context. The tuple includes at least one procedure and resources as arguments of the procedure. For example, when a read operation to the resource is required, data is read out from the resource and the procedure is invoked. The data is processed as input data of the procedure to produce final data for the name being input. When a write operation to the resource is required, the given data with write operation is processed by the procedure, then the processed data is written into the resource.

The name analysis unit 1 receives and analyzes the names, and outputs the name of the context. The context input unit 2 receives the name of the context output from the name analysis unit 1 and receives the context from the context holding unit 5, and outputs a tuple of procedures and resource names, that are obtained from the input name. At this time, there can also be input to the context input unit 2 again along with the obtained new resource names, and the names that were obtained may be recursively executed until the resource of the name are already implemented. "Implemented" means there exists a system that returns the handle of the specific operation applicable to the resources. As for resource initiation unit 3, in the case of read operation of the data from the resources, the output port of the procedures that were included in the tuple which were generated by context input unit 2 is connected to the data output port of data input/output unit 4. In the case of write operation, the input port of the procedure is connected to the output port of data input/output unit 4. Moreover, as for resource initiation unit 3, if there are resource names as arguments of the procedure in the tuple, in the case of read operation, the ports to access the resources are connected with the input/output ports that correspond to the arguments of the procedures, respectively. The connection is created only a predetermined number of arguments. Also, in the case of write operation, if there are resource names in the tuple, the output ports of the procedures are connected to the input/output ports to access to the resources specified by the resource names, respectively. Data input/output unit 4 sends the data input from the outside of this apparatus, for example, a file server or the like, to the procedures, and outputs the data from the procedures to the outside servers. In the case of read operation of the data from the resources, the data that was input from the output port of the procedure is output to, for example, the display. In the case of read operation of the data to the resources, the data is received that is displayed on, for example, the display, and input to the input port of the procedure.

The context holding unit 5 holds one or more contexts and outputs the context specified by a name or search query from the context input unit 2. The context may be any realization that analyzes the name and gives a rule for conversion. Here, the context is assumed to be tokenizer by special separators and a conversion table of token. The conversion table includes a name and corresponding resource representation. A set of the names may be expressed by a pattern. For example, it is possible to express plural names using one expression as well-known regular expression. The resource representation is a procedure name. A script program or an executable binary program may be output in place of the procedure name. The procedure in the resource representation may accompany one or more names of the real resource as the argument of the procedure. The real resource is a resource to which an operation is applicable and is a handle for the name of the resource. The resource representation may contain another resource representation in place of the name of the real resource. The resource representation is converted into a handle by the resource initiation unit. For example, the resource representation may be the handle to input or output the data which is obtained by processing, using the aforementioned procedure, the data being input or output from the handle corresponding to the argument of the procedure. The resource representation will be explained in detail later.

In this embodiment, the procedure, obtained as a result of conversion using the context, is started from the application: the application function is thus expanded. Starting from the application is accomplished, for example, using access to the resource. If the resource is, for example, a file system with files contained in the file system, then accessing is accomplished via reading or writing of the files. The context is loaded when the resource is accessed, consequently the selection of the function to be expanded is accomplished when the information is accessed. Hence, expansion of the function at the usage time is possible for each user.

It is possible to make the resource a file system. For example, groups represented by directories, and files. In addition, the resource may be a hypertext document expressed in HTML. In general, the resource may be a data stream that provides various services for accomplishing data input and output through communication between processes. That is to say, in the preferred embodiment of the present invention, application is possible to an information processing apparatus so that in a computer system including a host, memory, files, groups, ports, processes, users and databases, names are attached and, with respect to the names, resources are handled for which the handle is obtained to which the operation to the resource indicated by the name is applied.

Operations with respect to a file resource are called file operations. File operations are open, read, write and close, but are not limited to these. The operations may be any of these, or may be such that seeking is possible. These file operations may also have the same actions as the file operations of, for example, UNIX operating system. Additionally, the operations for the group resources are list member, add member and delete member. The operations for an HTML document may be such that some of the operations stipulated by the protocol known as HTTP are possible.

The handle is assumed to be the file descriptor obtained by opening the file in the case where the resource is a file. However, the handle may also be a pointer to the file handling data structure holding the attributes of the open file. The handle may also be a socket to which the operation for a file can be applied, or a pointer to the socket handling data structure. In general, the handle is a name, port, pointer, or ID for handling the resource.

This embodiment also includes an information processing apparatus satisfied by a single process of a single computer system. In general, the information processing apparatus of this invention is realized as a plurality of processes that act by mutually conducting communication in one or a plurality of computer systems. In general, communication may be realized using any communication between processes including remote programs, remote procedures, socket communication and memory sharing. Furthermore, in this embodiment the structure may have a cache for access to the resource.

Figure 2:
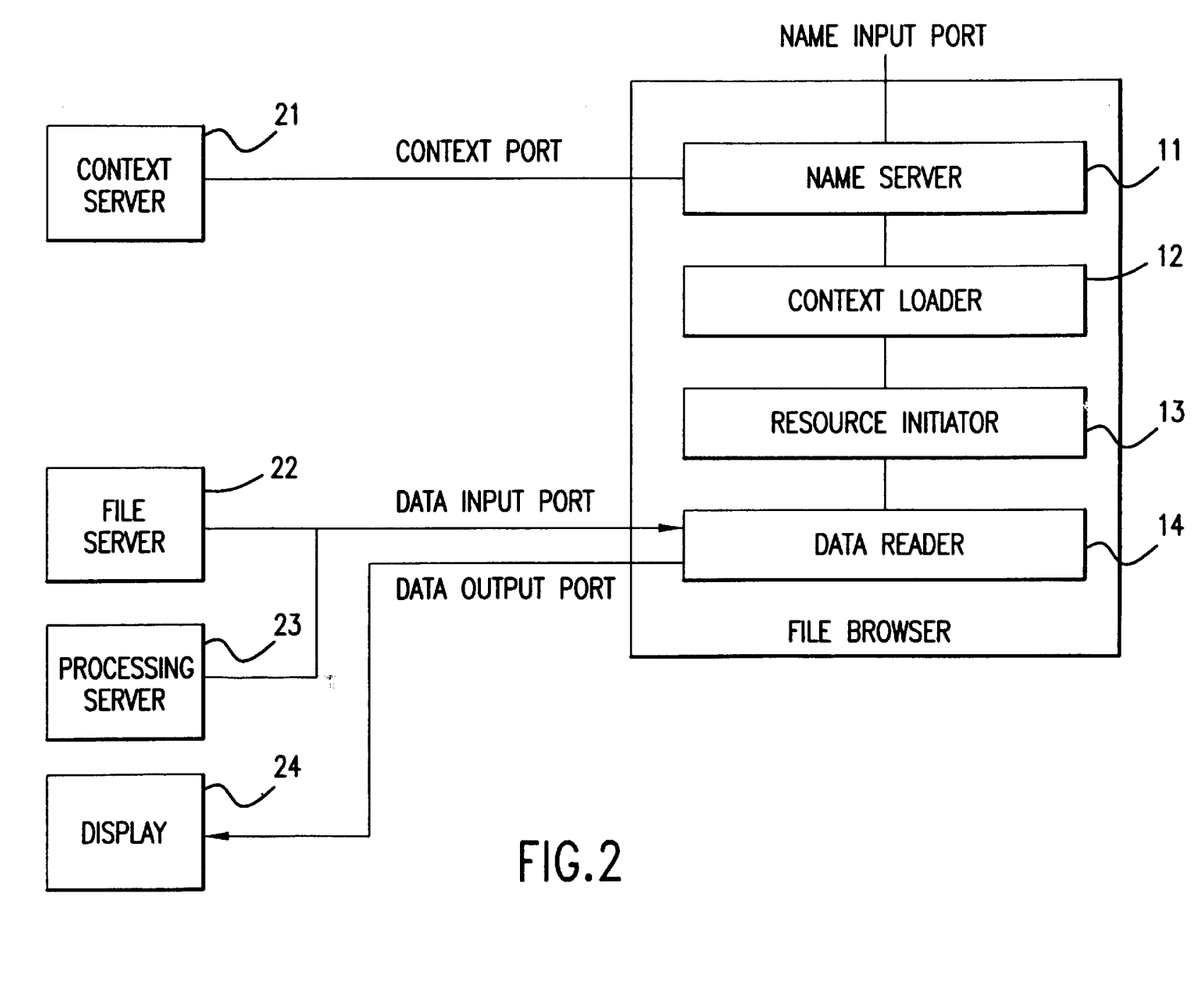
FIG. 2 is a block diagram depicting an example in one configuration of the embodiment of the information processing apparatus of the present invention.

FIG. 2 is a block diagram showing an example of one configuration of the embodiment of the information processing apparatus of the present invention. In this drawing, reference number 11 designates a name parser, reference number 12 designates a context loader, reference number 13 designates a resource initiator, reference number 14 designates a data reader, reference number 21 designates a context server, reference number 22 designates a file server, reference number 23 designates a processing server and reference number 24 designates a display. In this example, a file browser is composed.

The context server 21 holds the context, and is a file server that stipulates the name of the context and answers read requests. The context here is a normal file, and the contents are made into a table described by HTML.

The file server 22 is a normal file system. That is, when a file name is designated, the file handle is obtained and the server can read or write with respect to the file handle.

The processing server 23 is a computer or the like in which UNIX operating system is loaded, for example, and the procedures are processes. The input and output of processes are standard input and standard output of UNIX, for example. Here, the inputting of a process and the outputting of another process are linked through the pipeline of the UNIX operating system. In addition, the linking of the file handle and process input/output is accomplished through a file redirection provided by the UNIX operating system.

The name parser 11 is one example of the name analysis unit 1, and this server inputs the name from the name input/output port and analyzes this name. The context loader 12 is one example of the context input unit 2, and loads from the context server 21 the context corresponding to the name of the context which was input from the name parser 11. Furthermore, context that has been loaded, that is the table described using HTML, is analyzed using a specific method, and the resource representation is created. The resource initiator 13 is one example of the resource initiation unit 3, and comprises the pipeline by accomplishing intra-process communication between the file server 22 and the processing server 23 in accordance with the resource representation. The pipeline, for example in UNIX operating system, can be created using the "popen" system call and the "pipe" system call. The final output port of the pipeline is connected to the data input port of the data reader 14. The data reader 14 is one example of the data input/output port unit 4, and reads data in succession from the data input port and outputs data through the data output port. In this example, the data output via the data output port is output to the display 24 that is one example of an output apparatus, and is displayed.

The resource representation is defined recursively as the following term T. That is to say:

T::=H,
T::=<C,N>, or
T::=P(T1,T2, . . . , Tk).

Here, H is a resource handle, C is a context name, N is a resource name, P is a procedure name, T1, T2, . . . , Tk are resource representations, and k is the number of arguments of the procedure, and k is 0 or more. When k is 0, the procedure has no arguments and the resource representation is:

P1 ().

When k is 1, there is one argument, and the resource representation is:

P(T1).

For example, taking procedures P1, P2 and P3; contexts C1, C2 and C3; names N1, N2 and N3; and handles H1, H2 and H3, the following are all resource representations.

P1 ()

P1 (P2(H1,H2),H3)

P1 (H1,<C1,N1>,<C2,N2>).

Next, one example of the actions in a example of one configuration of the embodiment of the information processing apparatus of the present invention will be described. First, the part of behavior from when a name is input into the name parser 11 until the resource representation is output from the context loader 12 will be described using a example. Here, the case wherein the name "test.gif.300 dpi" has been input will be described as the example.

First, the name parser 11 tokenizes the name. This tokenize consists of delimiting the token by the character ".". The input name "test.gif.300 dpi" is tokenized into the name "test.gif" and the name "300 dpi".

Next, the context loader 12 loads from the context server 21 the context "300 DPI" on the basis of the name "300 dpi". In general, a conversion table is used which converts from a name to an arbitrary context name, but here the name is simple, and hence the name is used as the context name without change. However, in order to distinguish between the two, the name is shown in lower case and the context name is shown in upper case. As a result of this process, the incompletely resolved resource representation <300 DPI, test.gif> is obtained. A completely resolved resource representation refers to a resource representation that does not contain anything other than a procedure name and a resource handle. An incompletely resolved expression is assumed to contain one or more sets <C,N> of a context-name pair.

The context 300 DPI tokenizes the name separated by the character "." as part of analyzing and converting the name. The name "test.gif" is analyzed, and the name "test" and the name "gif" are obtained. In addition, from the conversion table in the context "300 DPI", the context name "GIF" corresponding to the name "gif" is obtained. Through this, the resource representation <300 DPI, <GIF,test>> is obtained.

The context loader 12 loads the context "GIF" from the context server 21. By converting the name "test" using the conversion table in the loaded context "GIF", the resource representation

RPC_CONV(X)

containing the procedure name is obtained. The results of converting the name "test" using this context "GIF" are obtained, and

RPC_300(RPC_CONV(X),Y)

is obtained, for example, from the context "300 DPI". In this way, the resource representation "RPC_300(RPC_CONV(X),Y)" is obtained from the input name "test.gif.300 dpi". The X and Y are sets of the resource handle or context-name pair, and if necessary, the same name conversion process can be recursively performed. Furthermore, when the context is determined by default depending on the procedure, the X and Y may be the resource name, omitting the context, in place of the context-name pair. When the context is omitted, for example, the name is assumed to be a local file system name, and this can be converted into a handle by opening the file.

As described above, when a resource representation is obtained by analyzing the name, it is possible to recursively execute the process so that the name obtained from a certain context is analyzed and converted using the same or a different context. Through this, it is possible to comprise the procedure when accessing the resource systematically or in strata, and to comprise the procedure so that the variation of the selection and the opportunity for selection for customize is designated more flexibly by designating and selecting each stratum individually.

Figure 3:
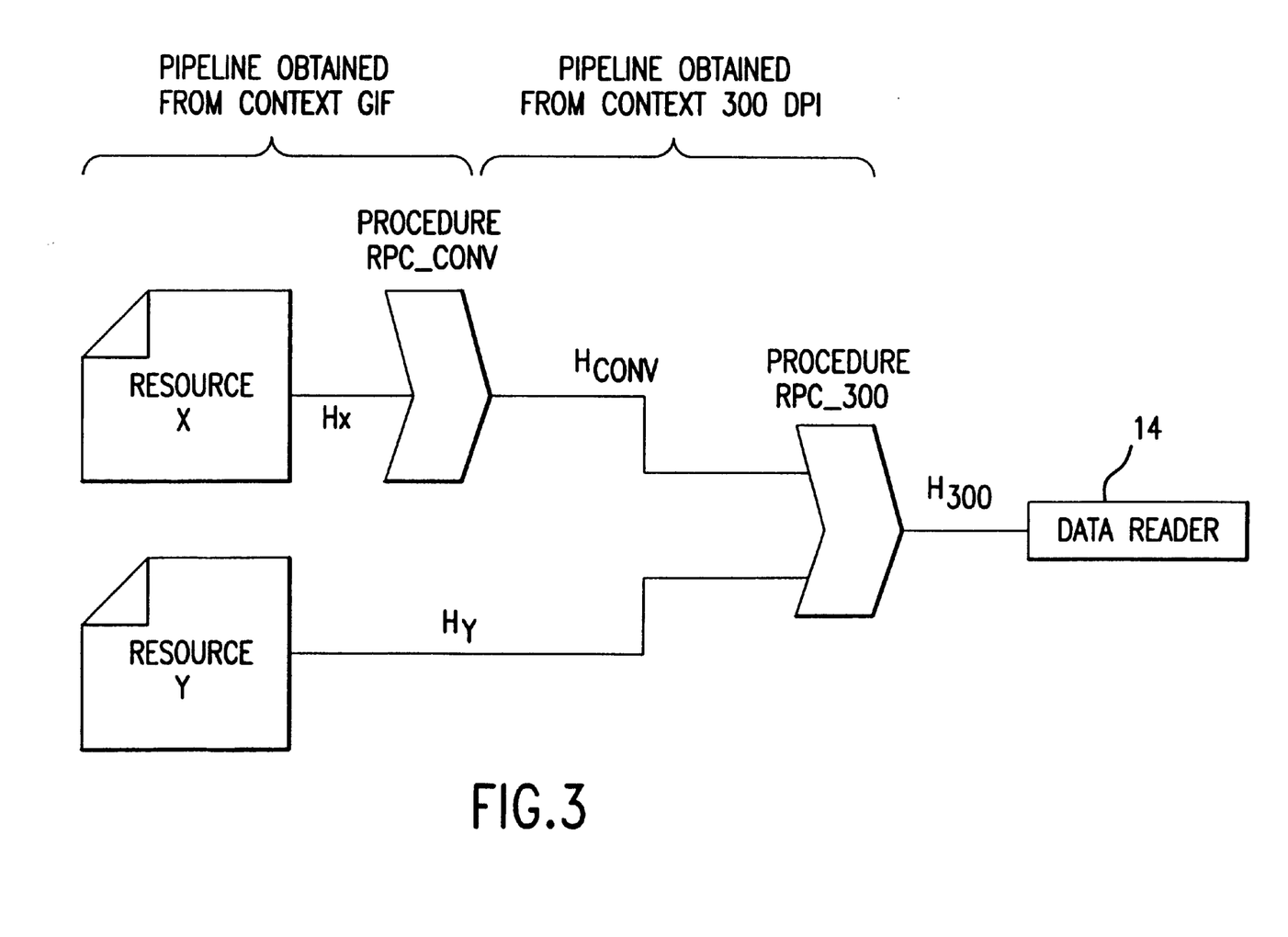
FIG. 3 is an explanatory drawing of the pipeline composed in the example in one configuration of the embodiment of the information processing apparatus of the present invention.

Next, the actions of the resource initiator 13 will be described using an example. FIG. 3 is an explanatory drawing of the pipeline composed in an example of one configuration of the embodiment of the information processing apparatus of the present invention. The resource initiator 13 realizes each procedure in the processing server 23 through a process on the basis of the resource representation obtained using the context in the context loader 12, and connects each process by means of the pipeline. Furthermore, the output of the terminal process of the pipeline is connected to the data input port of the data reader 14.

For example, the pipeline is composed of RPC (Remote Procedure Call). For RPC, it is possible to use the Sun RPC from Sun Microsystems Inc., for example. The RPC call is similar to a normal subroutine call, with the arguments stored in memory, a specific procedure is executed, and a resulting value is returned. However, the procedure is generally executed by a remote computer. In the case of RPC, the arguments are transferred to the remote computer as serialized data in a specific format depended on RPC protocol, and stored in memory as arguments of the procedure in remote computer and execution is accomplished. The return value is packed in serialized data and transferred from the remote computer with arguments in the same way.

Consider the resource representation

RPC_300(RPC_CONV(X),Y)

obtained as described above. RPC_300(A,B) has the two arguments A and B of a specific type that can be treated as the first and second parameters for RPC_300. In addition, RPC_CONV(C) has the argument C of a specific type of RPC_CONV input parameter. It is essential that the return value of RPC_CONV(C) is of the same type as the argument A.

The handle HX of the resource X in RPC_300 (RPC_CONV(X),Y) is connected to the first input argument port of the procedure RPC_CONV. This kind of connection of the handle and the input argument port is realized, for example in the UNIX operation system, by means of a "pipe" system call. In addition, the output of the procedure RPC_CONV is connected to the port of the first input argument of the procedure RPC_300 as the handle HCONV of the access to the resource that is virtually implemented regarding the resource representation RPC_CONV(X). The handle HY of the resource Y is connected to the second argument of the procedure RPC_300. The output port of the procedure RPC_300 is returned as the handle H300 of the access to the resource that is virtually implemented regarding the resource representation RPC_300(RPC_CONV(X), Y). In the above sequence, the pipeline is composed of the handle HX of the resource X, the handle HY of the resource Y, the procedure RPC_CONV and the procedure RPC_300. Finally, the output port of the procedure RPC_300 is connected to the data input port of the data reader 14.

Through the pipeline composed in this manner, the resource X in the file server 22 is input into the procedure RPC_300 by the procedure RPC_CONV being executed, and is input into the data reader 14 along with the resource Y in the file server 22 by the procedure RPC_300 being executed. The data reader 14 outputs the input data from the data output port to the display 24.

The results of processing the resource X converted by the procedure RPC_CONV, and the resource Y, using the procedure RPC_300 are displayed on the display by the user inputting "text.gif.300 dpi" as the name of the resource for which display is desired.

Thus, for the name of the information that the application accesses, it is possible to accomplish expansion of the function of the application by loading into the application the context determined as a result of analysis of the name, converting the name using the context, connecting the procedures determined as a result of the conversion into a pipeline shape, and reading the data processed via this pipeline. Consequently, it is possible to provide an expansion method for the function of the application such that the user or a third party can simply, or unconsciously to the user, apply the procedure to the data that has been read in order to access the resource.

Because the procedure is determined dynamically in accordance with the name input as described above, it is not necessary to load the procedure beforehand when the browser is started, as was the case conventionally, and the system thus has abundant flexibility. In addition, which procedure is executed is determined by the setting of the context at the point in time when the context is input, and consequently, it is possible to select the newest procedure each time the resource is accessed. Furthermore, because this apparatus does not down load a program from a network and does not execute it, prevention of the introduction of computer viruses or the like is easier, and this is also beneficial from the standpoint of security.

Next, the actions of one configuration of the embodiment of the information processing apparatus of the present invention will be described using another example. The name parser 11 analyzes the name on the basis of a specific syntax, but the algorithm that performs the analysis may be any kind, and for example may be executed by a well known LL parser or LR parser. In this example, pattern matching using a simple regular expression is accomplished.

The name is input in the format:

"//"+context name+"/"+resource name

Here, the characters " " and + are metasymbols added in order to prevent confusion in the explanation, and are not included in the actual name. The character+means to concatenate the characters. In addition, the context name is a character string. Furthermore, the resource name is a character string, and a character string interposed between "and" is that character string itself.

A set of names represented by this format, for example in the regular expression of Perl language, matches the following expression:

m!//(.*)/(.*)!

The meaning of this format is that "m" is a match command, "!" signifies the start and end of the regular expression, "/" is a character, and ".*" is a concatenation of 0 or more arbitrary characters. Character strings that match the contents of the character sequence inside of the opening parentheses "(" and the closing parentheses ")" are bound from the left side of this expression to the variables $1, $2, etc, respectively. Accordingly, after the match, the context name is bound to the variable $1 and the resource name is bound to the variable $2.

In another example, the case where the name

//VFS1/MERGE2%FOO%BAR is given as input will be described. As a result of analysis by the name parser 11 as described above, the context name is determined to be VFS1.

The context named VFS1 is designated and load the context from the context server 21. Here, it is assumed that the context C1 is the context that is obtained in accordance with the context name VFS1. If the context server 21 is one which can be accessed by the well-known ftp protocol, the context C1 is input into the context loader 12, for example by the command:

get VFS1 which means retrieve command in ftp protocol.

Figure 4A:
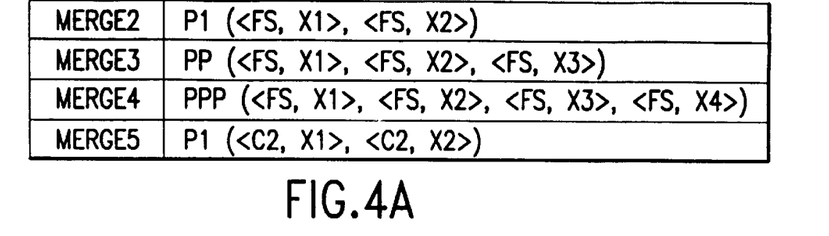
FIG. 4 is an explanatory drawing of one example of the context C1 in a second example of one configuration of the embodiment of the information processing apparatus of the present invention.
Figure 4B:
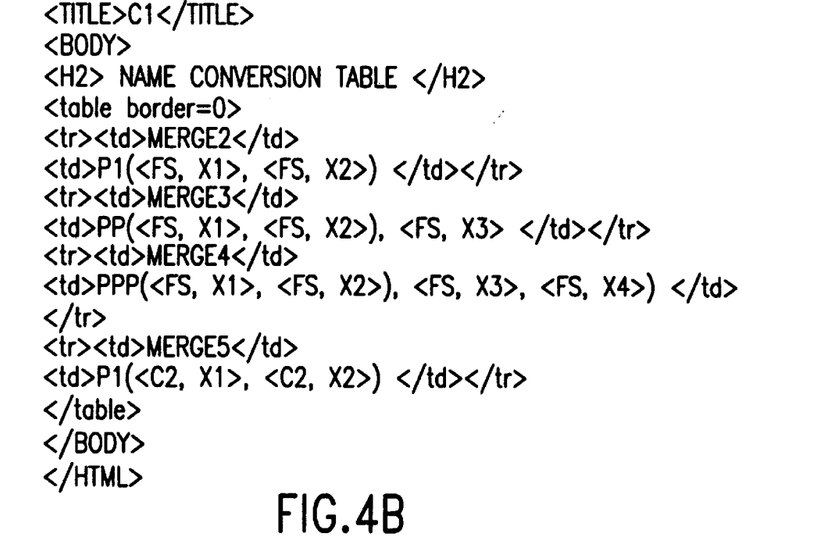

FIG. 4 is an explanatory drawing of one example of the context C1 in another example of the configuration of the embodiment of the information processing apparatus of the present invention. The contents of a context are a table, and the contents of the context C1 are, for example, the table shown in FIG. 4A. The method of composition for this kind of table is arbitrary, and may be, for example, an expression of the kind shown in FIG. 4B using HTML.

The context loader 12 separates the resource name and obtains a key and parameter for consulting the table. In this example, the name is separated by a pattern match by a regular expression using the character "%" as a key. Through this, key:MERG2 parameters:FOO,BAR are obtained. The conversion of the name is accomplished by looking up the name conversion table that composes the context using the key, and replacing the variables contained in the results with parameters in sequence, for example, as these appear from the left, and through this the resource representation is obtained.

Thus, when the table for the context C1 shown in FIG. 4 is consulted using the key "MERGE2", procedure P1(<FS,X1>,<FS,X2>)

is obtained, FOO and BAR are assigned, respectively, to the arguments X1 and X2, and as a result the resource representation

P1(<FS,FOO>,<FS,BAR>)

is obtained. Here, FS is the file system, and <FS,FOO> and <FS,BAR> can, respectively, be converted into file handles for when a file is opened that has a file name of FOO or BAR in the file system.

Figure 5:
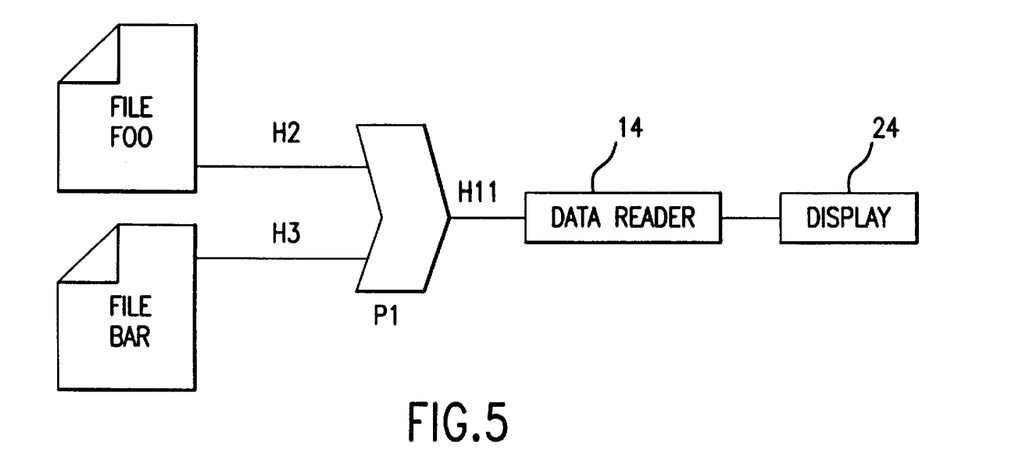
FIG. 5 is an explanatory drawing of the pipeline composed in a second example in one configuration of the embodiment of the information processing apparatus of the present invention.

FIG. 5 is an explanatory drawing of a pipeline composed in another example of the configuration of the embodiment of the information processing apparatus of the present invention. When H2 and H3 are the file handles for when the files for which the names of the file systems are FOO and BAR are opened, the file handle H2 is connected to the first argument port of the process P1 of the UNIX operating system, for example, and the file handle H3 is connected to the second argument port.

When the context loader 12 opens the file handle H2 with the second file descriptor and opens the file handle H3 with the third file descriptor, a subprocess is created by "fork" system call in the UNIX operating system, for example, and the process P1 is executed by "exec" system call. Through this, the two argument ports of the process P1 are connected to the files FOO and BAR, and the process P1 is executed. The output port of the process P1 is connected to the data reader 14, and the result of the procedure P1 being executed for the file FOO and the file BAR is displayed on the display 24.

In the above example, a specific procedure was executed when the contents of the file were read, and a process result was obtained by the procedure. It is also possible to build the system, for example, so that the data output port of the data reader 14 is connected to the file system 22, a procedure is executed with respect to the data output from the data reader 14, and the result is written to the file system 22. Furthermore, it is also possible to build the system so that a specific procedure is executed during input into the data reader 14, and a specific procedure is also executed during output.

In the examples to this point, the context is implemented by a name conversion table, and the application has a program that interprets the table as context. In the object-oriented way, it is also possible to implement the system so that a process that interprets the table, converts the name to a resource representation and composes the pipeline is included in the context object and such context object is loaded and executed simultaneously. In this case, the context object is implemented by the class object that includes the table as instance data and the procedure as a method being composed for example, using the well-known zip format and tar format that is an archive file format. The composition may also be such that the program that includes the tables and the procedures is divided into multiple parts and then loaded.

What is connected to the data input port and data output port of the data reader 14 is not limited to the above-described file system and display. Connection to an input/output apparatus and network, or to applications, is also acceptable. In addition, it is also acceptable for the data input port and the data output port to be connected to the same apparatus, system, or application, and it is possible, for example, to convert the data in the file by connecting the file system 22 to the data input port and the data output port of the data reader 14, and to again store the data as files.

Clearly from the above explanation, with the present invention, it is possible to execute a procedure in accordance with the settings of the context when accessing a resource. Determining which procedure to execute is made at the time the context is input, and consequently it is possible to select the newest procedure each time the resource is accessed by appropriately setting the context.

The implementer and provider of the context can provide, separate from the resource implementation, the procedures necessary when accessing the resource, and can designate providing of the application separately also. In addition, the accessor of the resource can select and load the desired context by designating all or a portion of the name of the resource, and as a result, it is possible to select the desired procedure finally to select, change or customize the implementation of desired resource, when accessing the resource on demand, so that the function of the application is expanded.

As a result, the user can execute the appropriate procedure automatically and simply when accessing the resource. By executing the appropriate procedure, high value added information access becomes possible. The user selects the context and modifies the contents of the context, and through this can expand the function of the application so that a unique procedure is possible in accordance with the objectives and intent of the user. Hence, it is possible to make an information processing apparatus flexibly.

By means of a second embodiment of the present invention, the prescribed buttons and switches are pressed, and in relation to the data that is indicated on the present display, an example is shown that drives the preprocessing and postprocessing.

Figure 6:
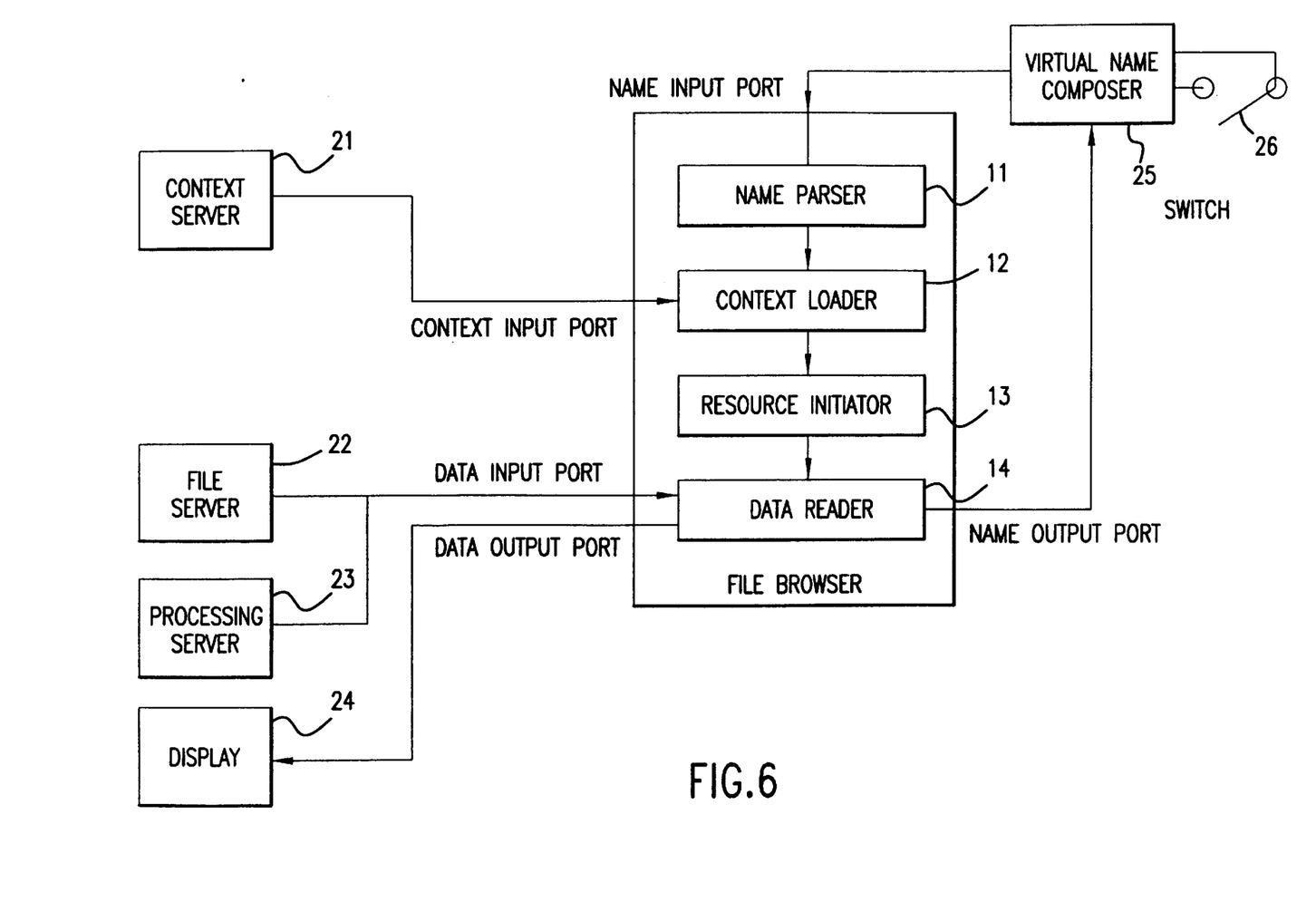
FIG. 6 is a block diagram depicting one configuration of the second embodiment of the information processing apparatus of the present invention.

FIG. 6 is the block diagram of the second embodiment. The same numbers are affixed to the same functions of the first embodiment. File server 22, processing server 23 and such can exist in plurality. Virtual Name Composer 25 is the procedure that generates the resource names. Switch 26 is a physical switch and GUI button of a windows system and the like. When switch 26 is closed, Virtual Name Composer 25 generates resource names, and inputs the generated resource names via Name Input Port to name analyzing section 11 of the file browser. The arrow sign in the figure shows the flow of data, but the command line is not illustrated.

In this embodiment, switch 26 is the GUI button indicated on display 24. The cursor is put on the GUI button area by a pointing device of the mouse or such, the events are driven by a click of the mouse button, and the specific program is executed that generates the resource names.

On a conventional window system, the type of Application Programming Interface (API) can be easily realized by anyone skilled in the art. For example, in the Abstract Windowing Toolkit (AWT) package that is offered in the Java language of Sun Microsystems Inc., there is the java.awt.Button class. Based on this class, the button that indicates the designated text label is displayed on the window. Upon mouse clicking this button, an event is generated that has that button in the arg (argument) field. Based on that event, a program related to the event is executed.

An example that handles this kind of button is explained in detail, for example, in chapter 18 of "JAVA by example second edition, ASCII PRESS"

The resource name generating procedures of Virtual Name Composer 25 are explained. The resource names which were obtained by these generating procedures are called virtual resource names. Discussed above, Virtual Name Composer 25 starts this procedure when switch 26 is closed.

In display 24, the data in k units is displayed by the file browser. The data names are given as $N\_1, N\_2, \ldots, N\_k$ respectively. For example, in the case where the file browser is the WEB browser, $N\_1, N\_2, \ldots, N\_k$ are URL respectively, and are displayed with $N\_1$ being "http://host1/a/b/c", $N\_2$ as "http://host2/d/e/f", and $N\_k$ as "http:hostk/x/y/z".

The names $N\_1, N\_2, \ldots, N\_k$ are output and received via name output port from the data reader in the file browser. Some of names $N\_1, N\_2, \ldots, N\_k$ may be virtual resource names. These respective names are names of the files that are currently indicated on the present display. In another method, the names of the files of k units that were formerly on the display are output in order. If there is the case where the file indicating functions pertaining to multi-Windows is prepared and entered, the file names which are displayed on each window are output in a prescribed order; for example, alphabetic order. In another method, the check button is prepared on each window, and select and establish names that output by the user clicking the check button by mouse.

Based on the conversion rule of name parser 11 which analyzes the composite names, the virtual resource names are generated. For example, by using the notation convention "f(x, y, z)", which shows the composition of the function f and arguments x, y and z, the virtual resource names can be generated. Also, in a different method, URL can be composed to include arguments, based on rules that pass the arguments to the procedures, which are known as Common Gateway Interface (CGI) programs of HTTP.

In this second embodiment, there is an example that generates a string which are made from context name F that includes the processing names that are allocated by the button, and the names N_1, N_2, . . . , N_k, into "F?arg1=N_1arg2=N_2& . . . &argk=N_k". In this case, there is easy operation since the virtual resource names are generated by concatenating strings. For example, in Perl, when resource names A, B, C are received, the virtual resource name "http://host4/narg.concat?arg1=A&arg2=B&arg3=C" is generated by means of the program:

```
$N[1]= "A";     #the value of argument 1 is A
$N[2]= "B";     #the value of argument 2 is B
$N[3]= "C";     #the value of argument 3 is C
$F="http://host4/narg.concat";
$V=$F;
$sep= "?";      #The separator between the argument and
                function is "?"
for $n(1..$k) {$V=$V.$sep."arg$n=".$N[$n];$sep= "&";}
        #The separator between arguments and argument is "&"
        #"." means the concatenate operation of strings
print "$V\n";
```

When the string representing an argument, or in other words, the received name, includes separator, it cannot be distinguished from the separator characters that are added here. In order to avoid this, that is, in order to be able to correctly handle separator characters which are for the separation of arguments, separator characters which are included in names N_1, N_2, . . . , N_k are escaped by a prescribed rule, before composing the virtual resource names. For example, in the case where the virtual resource names are URL, there is the way that converts "?" and "&" included in N_1, N_2, N_k into "%3F" and "%26" respectively. By this, 3F is the ASCII code for "?" by hexadecimal, and 26 is the ASCII code for "&". Similarly, ":" and "/" are also escaped. Conversion of this type is a simple pattern matching and substitution of string. The operation can be achieved by using regular expressions known in the art. A string substitution command with the regular expressions is implemented in the vi editor of UNIX, or the Perl language. Thus, in this second embodiment, special meaning characters in the arguments are escaped, when the virtual resource name is composed. But, after the virtual resource name is separated into arguments by the separators "?" and "&", restoration of the escaped special meaning characters (unescaping procedure) is performed so that the arguments restore their forms before the virtual resource name is composed. In the following explanation, it is assumed that the unescaping procedure for the arguments after separation has already been performed.

The virtual resource names generated by Virtual Name Composer 25 use, for example, the same method where a previously existing WEB server analyzes URL, and "?" and "&" symbols and made to be separators, and are analyzed at N_1, N_2, . . . , N_k and F by name parser 11. F is a context name that includes the process name. Based on the results that were analyzed, context loader 12 designates a context name, and loads the context from the context server 21. By using this context, resource representation f (N_1, N_2, . . . , N_k) is composed. Resource initiator 13 composes a processing pipeline between the resources of N_1, N_2, . . . N_k and the program of process name f. By the composed pipeline, the results of processed data from the resources N_1, N_2, . . . N_k is displayed on display 24.

Upon input of the virtual resource names that were generated by Virtual Name Composer 25 to the file browser, name parser 11 obtains the context name "http://host4/narg.concat" that includes the process names from these virtual resource names. The arguments "http://host1/a/b/c", "http://host2/d/e/f", and "http://hostk/x/y/z",justlike the first embodiment, are obtained.

Context loader 12 loads context narg from the prescribed context server (http://host4), based on the context name "http://host4/narg.concat". In this embodiment, the first part of the context name is made to be the context server, also based on the notation of URL. The context server can also be a Proxy Server of the World Wide Web system. In this case, the file browser loads the context from the default context server (prescribed Proxy Server). The context narg that is loaded is a table, for example:

| Process name, | Resource representation, | Argument type |
|---|---|---|
| concat, | RPC_CAT(X), | varargs X |
| reverse, | RPC_REVERSE(RPC_CAT(X)), | varargs X |
| extract, | RPC_EXTRACT(RPC_CAT(X)), | varargs X |

Here, X is a variable. Process name specifies the resolvable name in this context. The resource representation is a combination of the programs and arguments corresponding to the process name. The argument type shows the number and type of variables that are included in the resource representation. The "varargs" means an argument type where the number of arguments is determined with every call on the program, and which has a list of plural arguments. For example, there is a varargs type in UNIX operating system, which has arguments of variable numbers. Variable X is bound to a list including arguments.

X is transferred as a list ("http://host1/a/b/c", "http://host2/d/e/f", "http://hostk/x/y/z"). The unescaping procedure for the arguments in the list is already performed. By using the loaded context, resource representation RPC_CAT("http://host1/a/b/c", "http://host2/d/e/f", "http://hostk/x/y/z") is obtained, by a similar procedure described previously. The resource initiator 13 receives this resource representation, and sends out a request to processing server 23 so that RPC_CAT, which is executed on the remote computer (in this case, processing server 23), reads data by the prescribed protocol (in this case, HTTP) from the three files corresponding to the three arguments ("http://host1/a/b/c", "http://host2/d/e/f", and "http://hostk/x/y/z") in the list. RPC_CAT concatenates multiple files like the cat command of UNIX operating system does.

Processing server 23 generates a socket port that is a handle which outputs the results of RPC_CAT, and the socket port is bound to a socket port generated by the resource initiator 13 that sends out the request. The resource initiator 13 connects the socket port to the data input port of the file browser. Therefore, the results which were processed by RPC_CAT are input to the file browser, and displayed on display 24.

The above embodiment describes an example that analyzes a string included in context name F (http://host4/narg.concat), determines the context server (http://host4), loads a context (narg) that is locally defined in the context server, and determines one entry (concat) in the loaded context, so as to compose the resource representation. Further, any of the arguments can be a parameter or a command, in order to change the operation of the program in a resource representation.

For example, when an entry of concat of narg is

| Process name, | Resource representation, | Argument type |
|---|---|---|
| concat, | RPC_CAT(M,X), | stringM, varargs X | and arg1=reverse as the first argument, the concat treats the second argument as a list, and the first argument is interpreted as a program name or parameter that changes the operation of the concat. Specifically, the condition judgment is used in the program so that the string given as the first argument is compared with a condition. If the string is "reverse", the processing is appended to reverse the byte order of the contents of all lines. Given these results, every line that is included in the concatenated data has the byte order reversed.

From the above operations, when buttons or switches are clicked, the file browser can perform a process that concatenates the files currently displayed or the files displayed before the clicking. The concatenating process was not prepared on the file browser beforehand. By the expansion based on plug-in of prior art, modules that performs the concatenating processes should be loaded to the file browser. Meanwhile, by means of this invention, concatenating process can be used in the file browser by simply composing a virtual resource name including the context name which determines the concatenate process. Thus, the method of the present invention, which generates a virtual resource name, is easier than the conventional plug-in method, and an expansion of the functions can be easily performed.

Next, an example that generates by using a button a resource name of "test.gif.300 dpi" that is explained in the first embodiment, will be explained. In a generating procedure of the virtual resource name, if the context name that includes the process name being assigned to the button is "300 dpi", and the resource name that is input to the process is "testgif", "test.gif.300 dpi" is generated by the synthesis of the strings. The generating rule of the virtual resource name in this case concatenates the process names to the tail of the current resource names. For example, in relation to resource names N_1, N_2, . . . , and N_k, a virtual resource name "N_1.N_2. . . . N_k.F" is generated. In this example, only one argument N_1 is "test.gif", and F is "300 dpi". Now, the virtual resource (the results of the execution of RPC_CONV(X)) that is designated by resource name (virtual resource name) "test.gif" is displayed on display 24. When the button is pushed, virtual name composer 25 receives "test.gif" from data reader 14, and generates "test.gif.300 dpi". This virtual resource name can be suited just like for the first embodiment. Thus, the displayed data test.gif before the button is pushed is converted to the image that has the precision of 300 dpi, and the new image after the conversion is displayed.

As described above, if a prescribed context name F and a name generating procedure that can be determined independently of the context name F, the expanded function determined by the context F can be used by, for example, pushing a switch, button or the like at all times. This kind of effectiveness is obtained in addition to the effectiveness of the first embodiment. Since the name generating procedure can be implemented by the simple concatenation of strings, functions can be expanded easier, as compared with the conventional processes that integrate the plug-in modules. Further, similarly to the first embodiment, since the program to be invoked can be altered at will by modifying the content of the context, it would be possible to user the newest versions of programs as expanded functions. Since each context can be attained by a table or hash table, the loading of the context from the context server can be attained by an equivalent design where the plug-in is loaded from the file server. Since the plug-in is the program, integrating the plug-in modules to a local PC has a characteristic which is not favorable for security. Meanwhile, in the present invention, since the program is executed without loading executable module into its process space, security problems never occur, as explained earlier.

What is claimed is:

1. An information processing apparatus for a computer system, comprising:

resource management means for managing resources realized on the computer system;

processing means for receiving input data and executing a procedure for processing the input data so as to generate a new resource;

context management means for managing at least one context, which includes a rule for converting a name into a resource name and a procedure, the resource name specifying the resource managed by said resource management means, the procedure for processing data from the resource specified by the resource name;

context input/output means for loading the context from said context management means, receiving a name, interpreting the name in accordance with the loaded context so as to determine a resource name and a procedure corresponding to the name;

resource initiation means for instructing said processing means to generate the new resource by executing the procedure determined by said context input/output means for processing the data from the resource specified by the resource name determined by said context input/output means; and data input/output means for receiving the new resources that are generated by said processing means.

2. An information processing apparatus for a computer system, comprising:

resource control means for controlling resources realized on the computer system;

data input means for inputting data;

processing means for receiving the input data and executing a procedure for processing the input data;

context management means for managing at least one context, which includes a rule for converting a name into a resource name and a procedure, the resource name specifying the resource managed by said resource management means, the procedure for processing data inputted by said data input means;

context input/output means for loading the context from said context management means, receiving a name, interpreting the name in accordance with the loaded context so as to determine a resource name and a procedure corresponding to the name; and resource initiation means for instructing said processing means to execute the procedure determined by said context input/output means for processing the input data inputted by said data input means, and outputting the result of the processing of the input data to said resource management means as the resource that is specified by the resource name determined by said context input/output means.

3. The information processing apparatus of claim 1, wherein said context input/output means repeatedly uses the loaded context for interpreting the name so as to determine resource names and procedures corresponding to the name.

4. The information processing apparatus of claim 3, wherein said context input/output means loads a plurality of contexts from said context management means, uses the plurality of contexts recursively for interpreting the name so as to determine resource names and procedures corresponding to the name.

5. A file browser for a computer system having a resource manager that manages resources realized on the computer system, and a processing section that executes a procedure for processing data from the resources managed by said resource manager to generate a new resource, comprising:

a context loader for loading a context, which includes a rule for converting a name into a resource name and a procedure, receiving a name, and interpreting the name in accordance with the loaded context so as to determine a resource name and a procedure corresponding to the name, the resource name specifying the resource managed by said resource manager, the procedure for processing data from the resource specified by the resource name;

a resource initiator for instructing said processing section to generate the new resource by executing the procedure determined by said context loader for processing the data from the resource specified by the resource name determined by said context loader; and a data reader for receiving the new resource generated by said processing section, and displaying the new resource on a display.

6. An information processing device used in a computer system having a resource manager that manages resources realized on the computer system, and a processing section that executes a procedure for processing data from the resources managed by said resource manager to generate a new resource, comprising:

a switch for receiving a user instruction;

a file browser that displays on an display the resource controlled by said resource control section;

a name output section that outputs a resource name which specify the resource that are displayed on the display by said file browser;

a virtual name composer that receives the resource name output by said name output section, the virtual name composer generating a first name in accordance with the procedure name specifying the procedure that was executed by said processing section and the received resource name;

a context loader for loading a context, which includes a rule for converting a name into a resource name and a procedure name, receiving the first name generated by said virtual name composer, and interpreting the first name in accordance with the loaded context so as to determine a resource name and a procedure corresponding to the first name, the resource name specifying the resource managed by said resource manager, the procedure name specifying the procedure executed by said processing section;

a resource initiator for instructing said processing section to generate the new resource by executing the procedure specified by the procedure name determined by said context loader for processing the data from the resource specified by the resource name determined by said context loader; and a data reader for receiving the new resource generated by said processing section, and displaying the new resource on a display.

* * * * *